United States Patent [19] [11] 4,121,623
Rhone [45] Oct. 24, 1978

[54] SPACER FOR CONCENTRIC TUBES

[75] Inventor: Peter Rhone, Berlin, Fed. Rep. of Germany

[73] Assignee: Kabel-und Metallwerke Gutehoffnungshutte, Hanover, Fed. Rep. of Germany

[21] Appl. No.: 702,325

[22] Filed: Jul. 2, 1976

[51] Int. Cl.² .......................... F16L 9/18; F16L 11/12; F16L 59/14
[52] U.S. Cl. .................................... 138/114; 138/148; 138/149
[58] Field of Search ............... 138/112, 114, 148, 149; 220/15

[56] References Cited
U.S. PATENT DOCUMENTS

| 319,738 | 6/1885 | McKinney | 138/148 |
| 3,473,575 | 10/1969 | Vogelsang et al. | 138/149 |
| 3,592,238 | 7/1971 | Scheffler et al. | 138/149 |
| 3,595,275 | 7/1971 | Steans et al. | 138/114 |
| 3,670,772 | 6/1972 | Ziemek et al. | 138/114 |

Primary Examiner—Richard R. Stearns
Attorney, Agent, or Firm—Smyth, Pavitt, Siegemund, Jones & Martella

[57] ABSTRACT

The spacer is helically wound on the inner one of two concentric tubes, and is constructed from plural elongated, generally flat members of different cross-section and profile for surface contours permitting only limited contact between adjacent members. Alternation between convex and concave surfaces prevents lateral shifting of the members off each other.

4 Claims, 3 Drawing Figures

SPACER FOR CONCENTRIC TUBES

BACKGROUND OF THE INVENTION

The present invention relates to a spacer for coaxial tube systems having concentric tubes which have different temperatures such as occur in a cryogenic conduit and/or cable system, or a conduit system for hot fluids.

Spacers are known for coaxial tube systems which are of helical configuration and provide for some but very limited contact with the tubes. Such spacers are, for example, constructed from multiple ply layer systems. See e.g. U.S. Pat. Nos. 3,592,238 and 3,670,772. The tapes or ribbons used here have a rather low thermal conductivity and engage each other at isolated spots and areas. Also, the bundle is twisted to minimize contact with the tubes further.

A cryogenic conduit system has, for example, an inner tube which contains the conductors and/or is otherwise filled with and passed through by liquid helium. This tube is inserted in plural outer tubes which are provided for establishing a controlled temperature gradient. For example, the ring space between the inner tube and the next one may be evacuated, the space between the latter and the next one may be filled with some low temperature liquid, e.g. liquid nitrogen. The space to the next outer tube is again evacuated. In each instance one needs some kind of spacer construction between respective two concentric tubes facing each other directly in radial direction. A similar tube system can also be used as conduit for other low temperature fluids.

All these systems are economical only if the heat losses through conductor connection and radiation are very small. In all these systems one needs spacers which limit the heat flow across the space between the respective two tubes. See also, e.g. U.S. Pat. Nos. 3,826,286; 3,791,416. Particularly, the spacers as per the two earlier mentioned patents are very satisfactory, nevertheless, it is of great interest to further improve spacers for still higher impedance against flow of heat.

DESCRIPTION OF THE INVENTION

It is an object of the present invention to provide a new and improved spacer construction which impedes thermal flow between an outer and an inner tube still further.

In accordance with the preferred embodiment of the present invention, it is suggested to provide the spacer as an assembly of superposed, more or less flat elongated members which differ in cross-section and contour. This way, one can make certain that respective two adjacent members engage each other along very limited, small, generally line-shaped areas. This assembly is helically wound on an inner tube and holds it in the sourrounding outer tube.

Minimum of contact between adjacent members is obtained by contouring the respective engaging surfaces differently. Also, of respective adjacent two members one may be provided with a convex surface, the other one with a concave surface for mutual engagement, whereby the surfaces have different, non-mating contours to ensure limited line contact.

Generally speaking, the engaging surfaces of adjacent members should not permit broad surface to surface contact, and noncomplementary different profiles of the members make sure that for the most part the members remain to some extent spaced apart, even though they are assembled as an elongated unit. Also, the profile may change along the extension of the members, and one may alternate the materials by optimizing mechanical strength for one material and resistance against heat flow in the other material.

The profiles and surfaces of engagement should be selected so that the members cannot readily slide laterally on each other. The convex-concave alternation meets readily this objective. Such lateral positioning is particularly advantageous during winding of the spacer onto the inner tube. The members may be tied together additionally but that needs to be done to a limited extent only.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 shows an inner tube 1 serving as conductor for fluid to be thermally insulated from the environment either because the fluid is much hotter or much colder than the environment. In the latter case the tube may also include cryogenic conductors, or its interior surface may be superconductive. In any event, an outer tube 2 is presumed to have a different temperature and the space between tubes 1 and 2 is evacuated. The inner tube 1 is held in tube 2 by means of a spacer constructed to be a very poor conductor of thermal energy.

Figure 1:
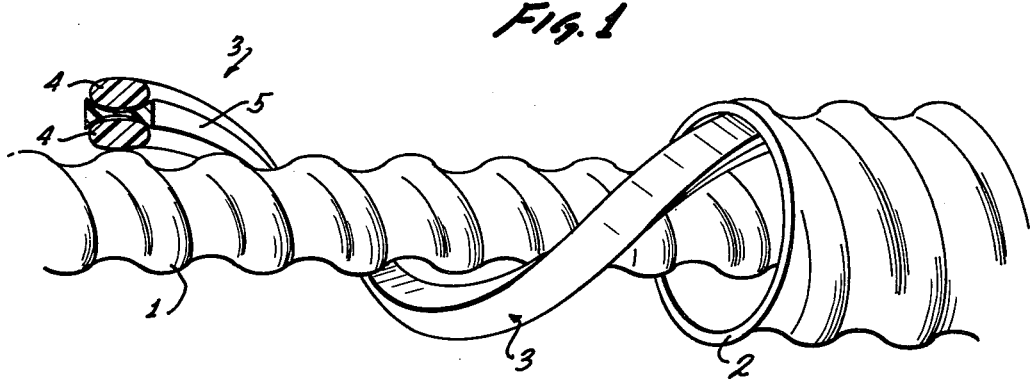
FIG. 1 is a cut open side view of a coaxial tube system with a spacer constructed in accordance with the preferred embodiment of the invention.

By way of example, tube 1 may be a conduit for liquid helium having a temperature of about 4° K while liquid nitrogen flows around tube 2 at a temperature of about 77° K. Thus, a temperature difference exists between tubes 1 and 2 of about 73° C. The vacuum maintains that differential and the spacer must not establish a significant conduction for thermal energy. Nevertheless, if the vacuum between tubes 1 and 2 is very good, any heat flow (other than radiation which poses a separate problem) runs almost exclusively through the spacer whose presence is per se unavoidable. The spacer must, of course, maintain the tubes in the particular concentric relation to each other and must impede that unavoidable heat flow as much as possible without loss in strength for performing its function as spacer.

The spacer 3 is constructed from a plurality of, e.g. three elongated, more or less flat members, but having different profiles and being arranged one above the other. The two members 4 have similar profiles defined by an overall convex contour, i.e. an elliptical cross-section. The member 5 in between has a double concave cross-section with hyperbolical surface profile and contour. Thus, as members 4 are superposed, i.e. placed, upon member 5 from opposite sides, contact is made only along discrete areas 6 permitting very little passage of thermal energy. In other words, the respective adjacent convex and concave surfaces of respective two adjacent ones of the members having non-mating contour so that flat surface to surface contact is not possible.

Due to the fact that contacting surfaces are concave and convex, respectively, they are maintained in position to each other in that the concave surfaces act in cradle-like fashion. This is important because upon winding the spacer onto tube 1, the members may tend to slide off each other. The assembly of elongated members may be fastened to each other in isolated areas by looping thread around them or through sewing or other known techniques.

The members can be made of any material that can stand, e.g. low temperatures without loosing the required strength. For example, plastic on the basis of polytetraflouroethylene is well suited. One can also use different materials in that, for example, one type of material is relatively strong but its thermal conductivity is not at the desired minimum, and that material is alternated with material of very low thermal conductivity even though its strength is low. This way, one can optimize strength and thermal conduction requirements.

Figure 2:
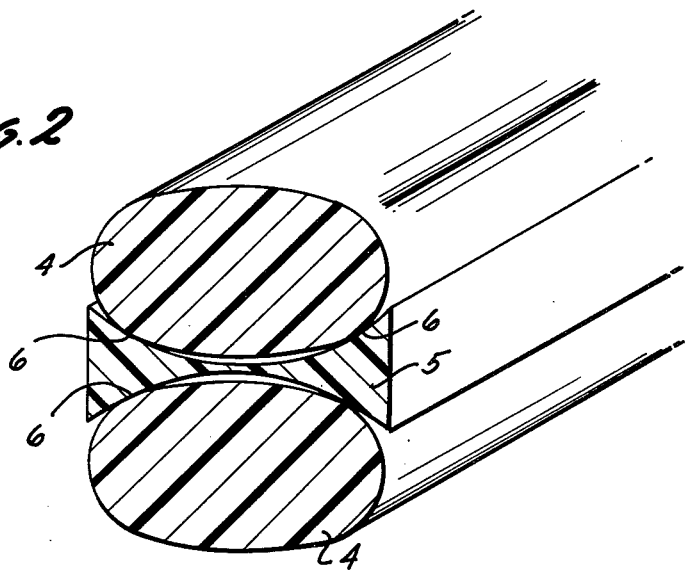
FIG. 2 is a perspective section view of the spacer on an enlarged scale.
Figure 2A:
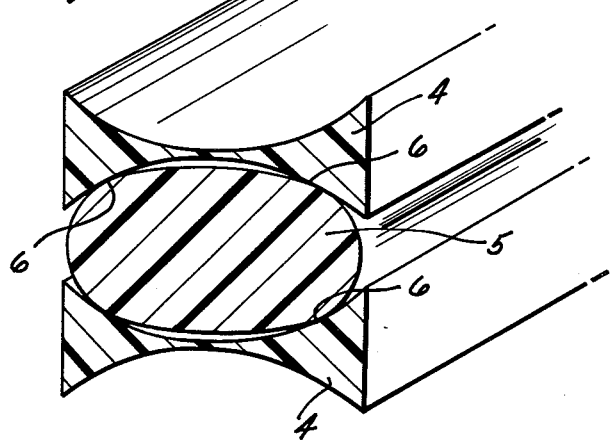
FIG. 2a shows that same spacer but at a different location.

FIG. 2a depicts representatively the possibility that the members may change cross-section along their extension. Also, it should be noted that the spacer assembly can be made of any length to obtain a uniform spacer construction without interruption which may require special fastening points. Continuous conduits may be, e.g. 250 meters long and the spacers must be correspondingly even longer due to their helical configuration when in place.

The invention is not limited to the embodiments described above but all changes and modifications thereof not constituting departures from the spirit and scope of the invention are intended to be included.

I claim:

1. A spacer for a coaxial tube system having an inner tube and an outer tube, the spacer being helically wound on the inner tube for holding the inner tube in and concentric to the outer tube, comprising:

a plurality of superposed elongated members adjacent ones of which have different cross-sections defining pairs of engaging, differently contoured, non-mating surfaces which are shaped to permit a stable engagement between pairs with a minimum of contact therebetween, and wherein at least one of said pairs is formed by cross-sections defining a convex surface facing and in engagement with at least two spaced points of a concave surface.

2. A spacer as in claim 1, having at least three members, of which at least two differ in cross-section.

3. A spacer as in claim 1, wherein respective adjacent ones of the members are made of different materials.

4. A spacer as in claim 1, wherein the members change cross-section in longitudinal direction of extension.

* * * * *

UNITED STATES PATENT AND TRADEMARK OFFICE
CERTIFICATE OF CORRECTION

PATENT NO. : 4,121,623
DATED : October 24, 1978
INVENTOR(S) : Peter Rohner

It is certified that error appears in the above–identified patent and that said Letters Patent are hereby corrected as shown below:

[19]  RHONER

[75]  PETER ROHNER, Berlin, Fed. Rep. of Germany

[73]  Kabel- und Metallwerke Gutehoffnungshütte AG., Hannover, Fed. Rep. of Germany

*Signed and Sealed this*

*Twenty-seventh* Day of *March 1979*

[SEAL]

*Attest:*

RUTH C. MASON
*Attesting Officer*

DONALD W. BANNER
*Commissioner of Patents and Trademarks*